(12) United States Patent
Horii et al.

(10) Patent No.: US 8,289,571 B2
(45) Date of Patent: Oct. 16, 2012

(54) BIDIRECTIONAL MULTI-PASS INKJET PRINTER SUPPRESSING DENSITY UNEVENNESS BASED ON INTERVAL BETWEEN SCANS

(75) Inventors: Hiroyuki Horii, Kawasaki (JP); Hisashi Ishikawa, Urayasu (JP)

(73) Assignee: Canon Kabushiki Kaisha, Tokyo (JP)

( * ) Notice: Subject to any disclaimer, the term of this patent is extended or adjusted under 35 U.S.C. 154(b) by 657 days.

(21) Appl. No.: 12/498,681

(22) Filed: Jul. 7, 2009

(65) Prior Publication Data
US 2010/0007901 A1 Jan. 14, 2010

(30) Foreign Application Priority Data

Jul. 10, 2008 (JP) ................................. 2008-180680
Jul. 10, 2008 (JP) ................................. 2008-180681

(51) Int. Cl.
*H04N 1/034* (2006.01)
*H04N 1/60* (2006.01)
*B41J 2/21* (2006.01)

(52) U.S. Cl. ............ 358/1.8; 358/502; 358/518; 347/14

(58) Field of Classification Search ................... 358/1.8, 358/1.9, 3.26, 502, 518, 540; 347/1–5, 9–15
See application file for complete search history.

(56) References Cited

U.S. PATENT DOCUMENTS 6,789,867 B2 * 9/2004 Takahashi et al. .............. 347/12
7,396,100 B2 * 7/2008 Hara ............................... 347/19

FOREIGN PATENT DOCUMENTS

JP         2003-341022         12/2003

* cited by examiner

*Primary Examiner* — Scott A Rogers
(74) *Attorney, Agent, or Firm* — Cowan, Liebowitz & Latman, P.C.

(57) ABSTRACT

An image forming apparatus includes a color converting unit 330 for subjecting the input image data to a color conversion in accordance with ink color and generating a print image 400; a print data generator 370-*x* for generating print data of each scan corresponding to multiple scans of the print image generated by the color converting unit 330; print controller 380-*x* for controlling at least one of the color converting unit 330 or print data generator 370-*x* based upon the input image data 320 or a position on a scanning line of each dot to be printed in the print image 400 generated by the color converting unit 330; and a printer engine 180 for printing on the print medium based upon the print data generated by the print data generator 370-*x*.

4 Claims, 14 Drawing Sheets

FIG. 9A
FIG. 9B
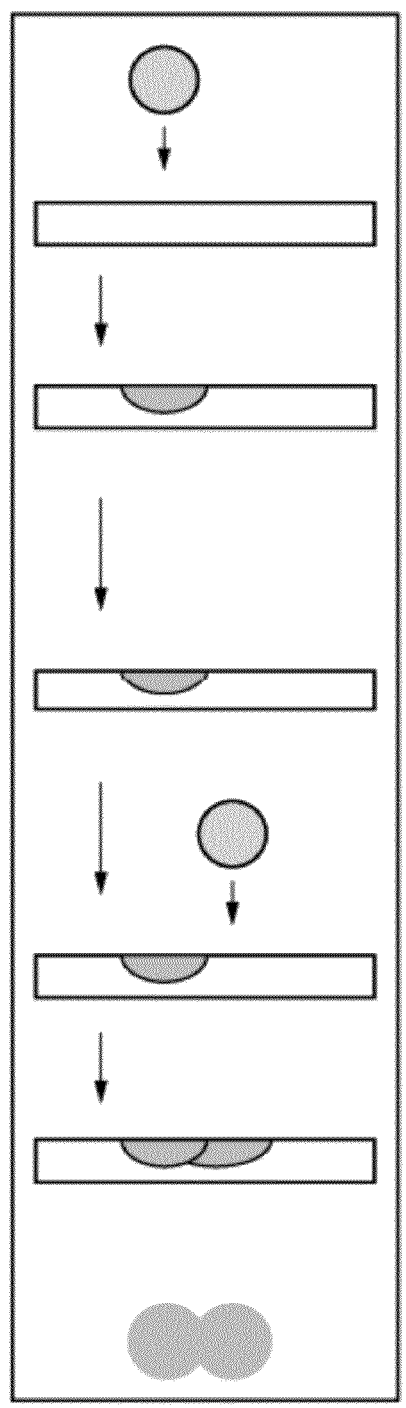
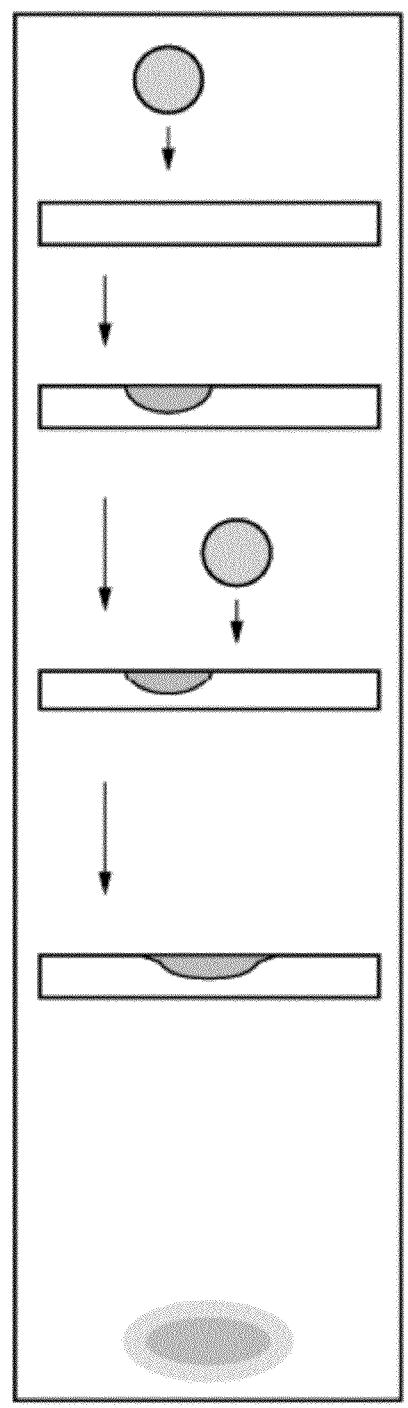

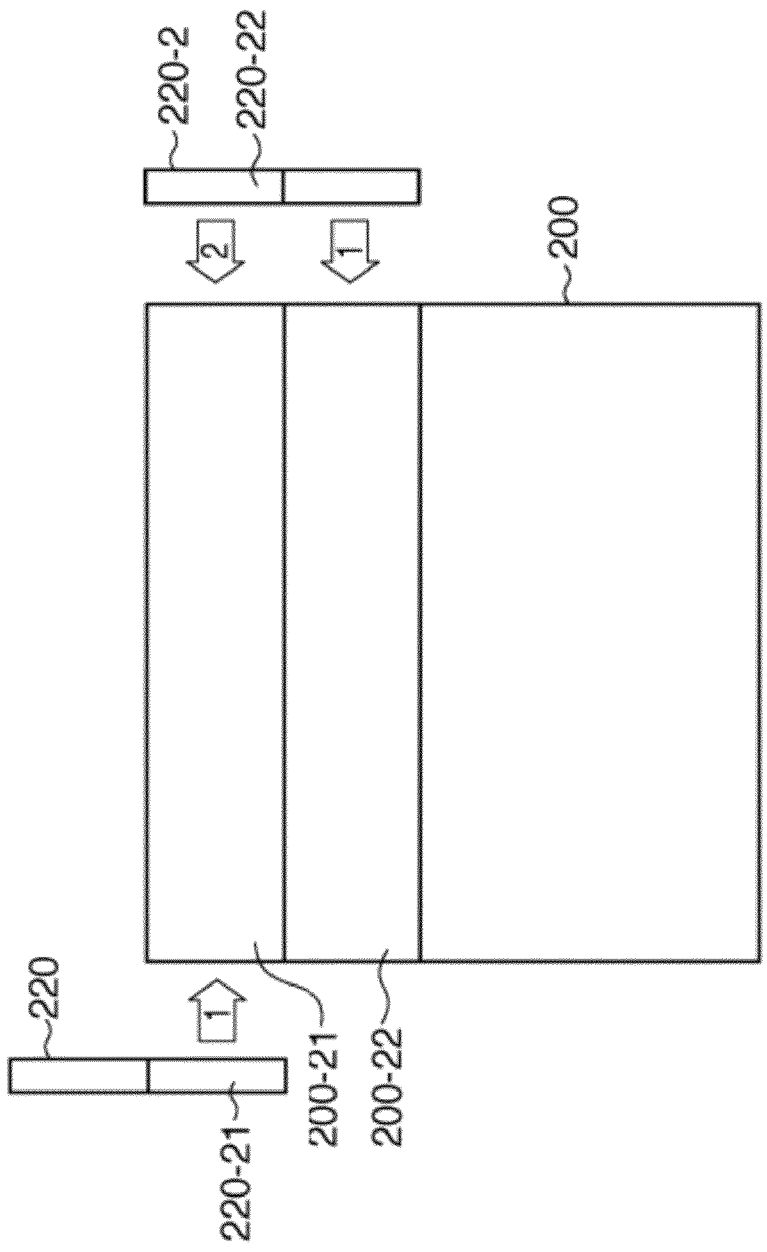

F I G. 12
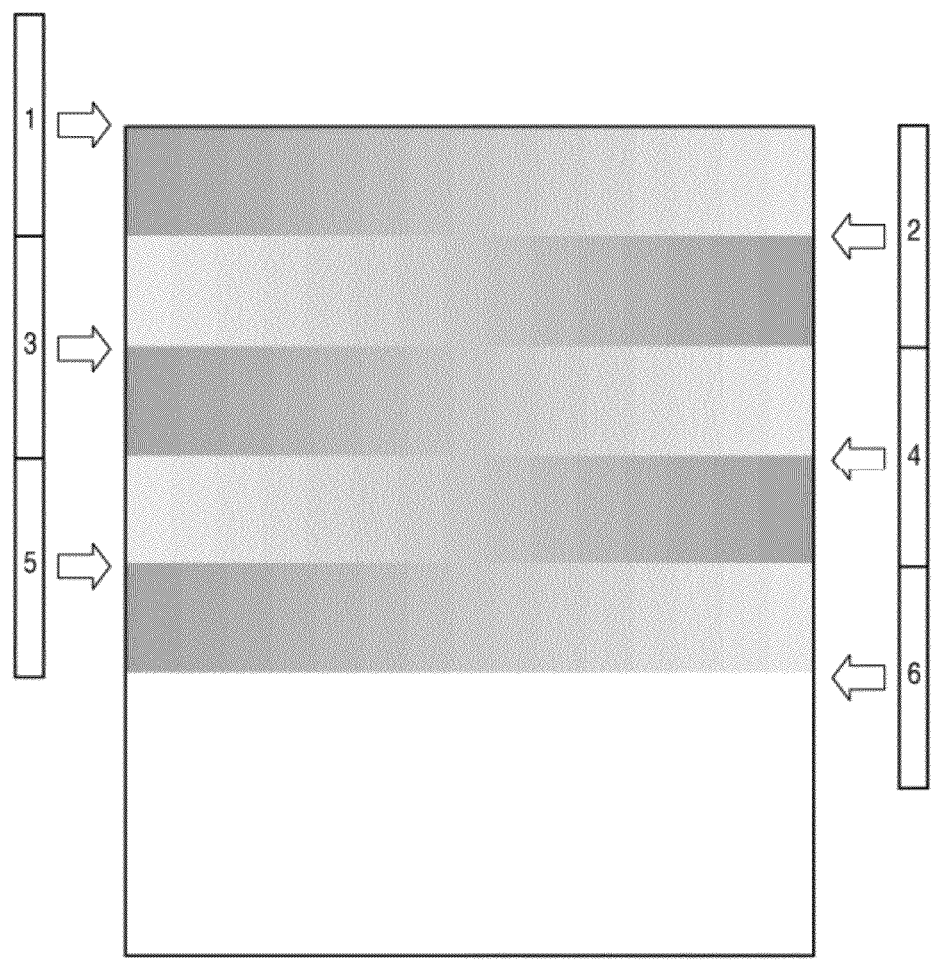

BIDIRECTIONAL MULTI-PASS INKJET PRINTER SUPPRESSING DENSITY UNEVENNESS BASED ON INTERVAL BETWEEN SCANS

BACKGROUND OF THE INVENTION

1. Field of the Invention

The present invention relates to an image forming technique for forming an image on a print medium.

2. Description of the Related Art

An ink-jet printing apparatus using a printhead having a plurality of ink discharge ports is known as one example of an apparatus that uses a printhead having a plurality of printing elements.

In an apparatus of this kind, there are instances where dots formed by ink undergo a variation in size and formation position owing to a fluctuation in the amount of ink discharged and the discharge direction thereof, and this can produce density unevenness in the printed image. In particular, in a serial-type printing apparatus that performs printing by causing a printhead to scan in a direction different from that in which the plurality of printing elements are arrayed (e.g., in a direction perpendicular to the element array direction), density unevenness ascribable to the above-mentioned fluctuation appears in the printed image as unevenness in the form of horizontal streaks. These streaks can be visually conspicuous and invite a decline in the quality of the printed image.

Further, in order to correct for such density unevenness, a method proposed in cases where use is made of an ink-jet printhead having a plurality of discharge ports is to form one line of image data, which has undergone halftone processing (binarization processing, etc.), by ink discharged from a plurality of different discharge ports. This is achieved by performing paper feed of less than the width of the printhead and complementing the image data of one line with multiple scans or passes. This method generally is referred to as "multi-pass printing". Multi-pass printing includes a method that uses a mask pattern and a method in which input image data that is to undergo multivalued printing is subjected to density partitioning in conformity with each pass and print data is generated for each pass of partitioned density. In all of these methods, input image data to be printed is printed upon being divided into a plurality of scans or passes.

An advantage of such methods is that since input image data to be printed is printed upon being divided into a plurality of scans or passes, there is less of a decline in image quality ascribable to horizontal streak-like unevenness caused by a variation in the characteristics of the printhead. However, a disadvantage is that printing time is lengthened correspondingly. For this reason, when a print medium is scanned with an ink-jet head, the general practice is to use bidirectional printing, in which printing is performed by back-and-forth scanning.

At present, pass division using a mask pattern generally is employed as the pass division method when such multi-pass printing is carried out. According to this method, initially the input image data is converted to print images of the respective ink colors, after which print data that relies upon a printhead is generated for every ink color. Then, when printing is actually performed, the printing of each pass is carried out upon taking the logical AND between the print data and the mask pattern. That is, the print data is generated in correspondence with each ink color based solely upon the input image data with no consideration being given to the printing method, such as the bidirectional printing method or multi-pass printing method.

Next, reference will be had to FIGS. 9A and 9B to describe how ink droplets that have been discharged from the ink-jet printhead of an ink-jet printer impact upon a print medium and are absorbed into and fixed to the print medium. FIG. 9A is a sectional view illustrating the state of absorption and fixation when ink droplets are discharged as adjacent pixels at a comparatively long time interval, and FIG. 9B is a sectional view illustrating the state of absorption and fixation when ink droplets are discharged as adjacent pixels at a comparatively short time interval. The diagram shown at the bottom of FIG. 9A is a top view illustrating the state of absorption and fixation of the ink droplets on the print medium. The diagram shown at the bottom of FIG. 9B is a top view illustrating the state of absorption and fixation of the ink droplets on the print medium.

In FIG. 9A, an ink droplet that has been discharged from the ink-jet printhead heads toward the print medium from above. When the discharged ink droplet impacts upon the print medium, the ink droplet is absorbed into the print medium. Next, after a comparatively long time interval, in a state in which the initial ink droplet has dried and become sufficiently fixed, an ink droplet is discharged as an adjacent pixel. Since the ink droplet that impacted first dries and is sufficiently fixed, the ink droplet that impacts subsequently partially creeps under the ink droplet that impacted and became fixed first. If the print medium is observed from above, it will be seen that the two ink droplets each impacted upon the print medium in the manner indicated at the bottom of FIG. 9A.

In FIG. 9B, an ink droplet that has been discharged from the ink-jet printhead heads toward the print medium from above in a manner similar to that shown in FIG. 9A. When the discharged ink droplet impacts upon the print medium, the ink droplet is absorbed into the print medium. Next, after a comparatively short time interval, in a state in which the initial ink droplet has not dried and become sufficiently fixed, an ink droplet is discharged as an adjacent pixel. When an ink droplet impacts as an adjacent pixel in a state in which the initial ink droplet has not dried and become sufficiently fixed, the two ink droplets are pulled together and drawn to the center by surface tension and merge into a single droplet. This resulting droplet is absorbed into the print medium, dries and becomes fixed. As a result, if the print medium is viewed from above, it is seen that only the central portion is dense, as shown at the bottom of FIG. 9B. Consequently, despite the fact that ink droplets were discharged twice, the resultant density on the print medium in FIG. 9B is less in comparison with the case where the ink droplet was discharged as the adjacent pixel after the initial ink droplet dried and became fixed sufficiently as in FIG. 9A. Thus, regardless of the fact that two ink droplets are discharged from the ink-jet printhead to form adjacent pixels, a difference develops in the density on the print medium owing to the ink-discharge time intervals.

In an effort to deal with this phenomenon in which a difference develops in printing density owing to the ink-discharge time intervals, a technique has been proposed in which, when the time interval becomes longer than usual owing to a recovery operation, etc., during the course of printing, subsequent printing is changed to have a dot size smaller than that of print data already generated [see the specification of Japanese Patent Laid-Open No. 2003-341022 (Document 1)].

Next, a procedure for performing two-pass printing on a print medium 200 will be described with reference to FIG. 10. FIG. 10 is a diagram illustrating the positional relationship between the print medium 200 and an ink-jet head 220.

The ink-jet head 220 has a nozzle portion 220-21 for performing printing of a first pass of two-pass printing, and a nozzle portion 220-22 for performing a second pass of the two-pass printing. A position 220-2 on the ink-jet head 220 is a relative position with respect to the print medium 200 when the second pass of printing is performed by the ink-jet head 220 following the first pass. The print medium 200 has an initial area 200-21 in which two-pass printing is performed on the print medium 200, and a second area 200-22 in which two-pass printing is performed on the print medium 200.

In an actual ink-jet printer, there is a mechanical mechanism for bidirectionally scanning an ink-jet head that employs a carriage (not shown). The ink-jet head is mounted on the carriage and is scanned back and forth above the print medium. In conformity with this bidirectional scanning of the ink-jet head mounted on the carriage, the print medium is transported by a transport mechanism (not shown). In actuality, the print medium is transported in the sub-scan direction that crosses the back-and-forth scanning direction (main-scan direction) of the ink-jet head mounted on the carriage. In order to simplify the description, however, in the next scan the ink-jet head 220 is scanned relative to the print medium 200 at the position 220-2.

In order to shorten printing time while using multi-pass printing, it is contemplated to achieve this by scanning the ink-jet printhead bidirectionally, as mentioned above. In the initial area 200-21 on the print medium 200, forward printing in performed from left to right by the nozzle portion 220-21 for performing the first pass of printing by the ink-jet head 220. Next, the print medium is transported and the ink-jet head 220 performs printing in the backward direction at position 220-2. At this time the second pass of printing is performed in the initial area 200-21 of the print medium 200 by the nozzle portion 220-22 for performing the second pass of printing by the ink-jet head 220. At the same time, the first pass of printing is performed in the second area 200-22 of the print medium 200 by the nozzle portion 220-21 for performing the first pass of printing by the ink-jet head 220.

When two-pass printing is performed, bidirectional printing by two scans of the ink-jet head 220 is performed in an area (e.g., 200-21) of the print medium 200, as described above, to thereby form an image. FIG. 11 illustrates this in the form of time.

FIG. 11 is a diagram illustrating the relationship between X coordinates and printing time in two-pass printing. The horizontal axis is a plot of the X coordinates of the print medium 200, and the vertical axis is a plot of printing time. With serial printing in which printing is performed by causing the ink-jet head 220 to scan above the print medium 200, an image is printed by discharging ink sequentially in the course of scanning the head forward or backward. Accordingly, the position scanned changes with the passage of time. That is, printing is performed on the right side of the print medium 200 at a time different from that at which printing is performed on the left side. A curve 230-1 in the graph of FIG. 11 is one representing X coordinates and printing times at these X coordinates when printing is performed by forward scanning. A curve 230-2 in the graph of FIG. 11 is one representing X coordinates and printing times at these X coordinates when printing is performed by backward scanning following printing by forward scanning according to curve 230-1.

As illustrated in FIG. 11, the time difference at identical X coordinates between the first pass of printing (curve 230-1) and the second pass of printing (curve 230-2) differs depending upon the X coordinates owing to bidirectional printing. Time difference (tl) on the left side of the print medium is longer than time difference (tr) on the right side. Further, as already shown in FIGS. 9A and 9B, the aforementioned phenomenon occurs in which density decreases when the printing time interval of adjacent pixels is short and increases when the printing time interval of adjacent pixels is long. This means that in a case where an image has been printed at uniform density, the densities on the right and left sides of the print medium will differ from each other. In this case, the density on the left side of the print medium will be high and that on the right side will be low. Although not illustrated, the first pass of printing in the area 200-22 of the print medium is in the backward direction and the second pass of printing in this area is in the forward direction, and therefore the size relationship in terms of the time differences between the right and left sides of the print medium reverses. The time differences on the left and right sides depend upon the scanning speed of the ink-jet head and the width of the print medium. In particular, the larger the width of the print medium, the greater the printing time differences and the more conspicuous the difference in density.

When printing is performed by scanning a print medium with an ink-jet head, if printing is carried out only at the time of forward scanning, the printing time interval when multi-pass printing is performed will be fixed and equal to the time required for the round trip regardless of the location on the print medium.

However, if printing is performed both forward and backward when a print medium is scanned with an ink-jet head, the time interval at which printing is performed by the ink-jet head differs depending upon the position on the print medium. That is, the printing time interval is short near where the ink-jet head changes direction between the forward direction and the backward direction and is long on the side opposite. This means that following printing with an initial droplet of ink, the printing with the next ink droplet will take place in a state in which the absorption and fixation of the initial ink droplet on the print medium has been completed or a state in which this absorption and fixation of the initial ink droplet on the print medium has not been completed.

With an ink-jet printer that forms an image by discharging ink onto a print medium, the density of color development differs depending upon the state of absorption and fixation of the printed ink. That is, even if printing is performed by multi-pass printing in which bidirectional printing is carried out with the same amount of ink, the final density that results from subsequent printing will vary depending upon the state of the ink printed first. As a result, the density and tint on the left side of the print medium will be different from that on the right side owing to bidirectional printing using the ink-jet head. Moreover, since the density difference between the left and right sides reverses whenever a round trip is made, the result is conspicuous band-type unevenness having a fixed width. In particular, such color unevenness becomes very noticeable in the case of a printer for printing on a print medium having a large width. FIG. 12 is a diagram illustrating such band-type unevenness.

Further, the printing time interval diverges greatly when recovery processing is executed during printing (recovery processing is processing, such as preliminary ink discharge or wiping, executed in order to maintain the head ink-discharge characteristic) and when printing is suspended unexpectedly (e.g., suspension due to the printer cover being opened by the user or suspension due to interruption in transfer of print data). As a consequence, color unevenness occurs when printing is resumed.

With the technique disclosed in Document 1, it is proposed that, when printing is performed following the occurrence of a time interval that is longer than usual owing to a recovery operation, etc., during printing, printing be carried out upon changing ink droplet size of print data from large dot to small dot without changing the print data already generated. As a result, when the time interval diverges greatly, lowering the printing density in the next scan is effective in eliminating the difference in printing density before and after.

However, although it is possible to suppress an increase in density in a case where the time interval has diverged greatly owing to recovery of the ink-jet head, it is not possible to suppress band-like unevenness, which is ascribable to a difference in printing density produced between both sides of the print medium, in a case where printing is performed in each of forward and backward scans. Furthermore, this difference in printing density reverses with each forward and backward scan and results in band-like unevenness that is very conspicuous.

SUMMARY OF THE INVENTION

Accordingly, the present invention has been devised in order to solve the foregoing problems and provides an image forming apparatus in which density unevenness ascribable to printing time intervals between scans is suppressed in multi-pass printing for performing printing in each of forward and backward scanning movements.

According to one aspect of the present invention, there is provided an image forming apparatus for forming an image by causing a printhead having a plurality of ink discharge portions to scan the same area on a print medium a plurality of times, and discharging ink onto the print medium, based upon entered image information, in each of forward and backward scanning movements to thereby form dots as individual pixels, the apparatus comprising: a color converting unit configured to subject the entered image information to a color conversion in accordance with ink color and generate a print image; a print data generating unit configured to generate print data of each scan corresponding to multiple scans of the print image generated by the color converting unit; a control unit configured to control at least one of the color converting unit and the print data generating unit based upon the entered image information or a position on a scanning line of each dot to be printed in the print image generated by the color converting unit; and a printing unit configured to print on the print medium based upon the print data generated by the print data generating unit.

According to another aspect of the present invention, there is provided an image forming method for forming an image by causing a printhead having a plurality of ink discharge portions to scan the same area on a print medium a plurality of times, and discharging ink onto the print medium, based upon entered image information, in each of forward and backward scanning movements to thereby form dots as individual pixels, the method comprising: a color converting step of subjecting the entered image information to a color conversion in accordance with ink color and generating a print image; a print data generating step of generating print data of each scan corresponding to multiple scans of the print image generated at the color converting step; and a printing step of printing on the print medium based upon the print data generated at the print data generating step; wherein at least one of the color converting step and the print data generating step is controlled based upon the entered image information or a position on a scanning line of each dot to be printed in the print image generated at the color converting step.

According to another aspect of the present invention, there is provided an image forming apparatus for forming an image by causing a printhead having a plurality of ink discharge portions to scan the same area on a print medium a plurality of times, and discharging ink onto the print medium, based upon entered image information, in each of forward and backward scanning movements to thereby form dots as individual pixels, the apparatus comprising: a color converting unit configured to subject the entered image information to a color conversion in accordance with ink color and generate a print image; a print data generating unit configured to generate print data of each scan corresponding to multiple scans of the print image generated by the color converting unit; a control unit configured to control at least one of the color converting unit and the print data generating unit based upon a printing time interval between scans; and a printing unit configured to print on the print medium based upon the print data generated by the print data generating unit.

According to another aspect of the present invention, there is provided an image forming method for forming an image by causing a printhead having a plurality of ink discharge portions to scan the same area on a print medium a plurality of times, and discharging ink onto the print medium, based upon entered image information, in each of forward and backward scanning movements to thereby form dots as individual pixels, the method comprising: a color converting step of subjecting the entered image information to a color conversion in accordance with ink color and generating a print image; a print data generating step of generating print data of each scan corresponding to multiple scans of the print image generated at the color converting step; and a printing step of printing on the print medium based upon the print data generated at the print data generating step; wherein at least one of the color converting step and the print data generating step is controlled based upon a printing time interval between scans.

In accordance with the present invention, there is provided an image forming apparatus in which density unevenness ascribable to printing time intervals between scans is suppressed in multi-pass printing for performing printing in each of forward and backward scanning movements.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 9A is a sectional view illustrating state of absorption and fixation of ink when ink droplets are discharged as adjacent pixels at a comparatively long time interval, and FIG. 9B is a sectional view illustrating state of absorption and fixation of ink when ink droplets are discharged as adjacent pixels at a comparatively short time interval;

FIG. 10 is a diagram illustrating the positional relationship between print medium 200 and an ink-jet head 220;

FIG. 12 is a diagram illustrating band-type unevenness;

DESCRIPTION OF THE EMBODIMENTS

Embodiments of the present invention will be described below in detail with reference to the accompanying drawings. It should be noted that the embodiments described below represent examples of means for implementing the present invention, and that the present invention is applicable to changes and modifications of the following embodiments within the scope of the claims.

First Embodiment

The image forming apparatus is an apparatus in which a printhead having a plurality of ink discharge portions is caused to scan the same area on a print medium a plurality of times, ink is discharged onto the print medium based upon entered image information in each of forward and backward scanning movements and dots are formed as individual pixels to thereby form an image. Further, in this embodiment, the image forming apparatus is constituted by an ink-jet printer having the structure set forth below.

Figure 1:
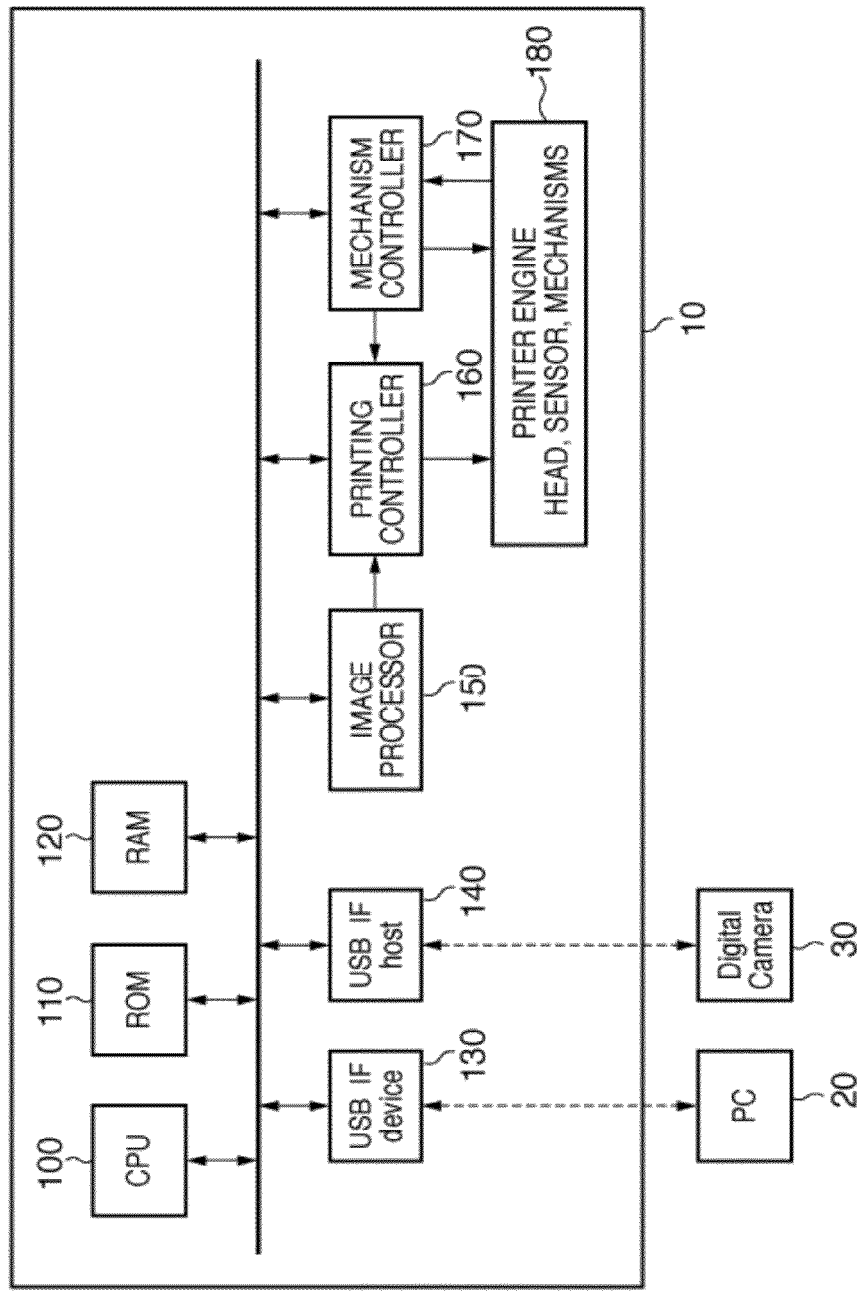
FIG. 1 is a block diagram illustrating the functional configuration of an ink-jet printer according to a first embodiment of the present invention.

FIG. 1 is a block diagram illustrating the functional configuration of an ink-jet printer according to a first embodiment of the present invention. Shown in FIG. 1 are a printer body 10, a personal computer 20 and a digital camera 30. Contained in the printer body 10 are a CPU 100; a ROM 110 in which the program of the CPU and table data have been stored; a RAM 120 for storing variables and data; a USB device interface 130 for accepting data from the personal computer 20; a USB host interface 140 for accepting data from the digital camera 30 or the like; an image processor 150 for subjecting a multivalued image, which has been input from the digital camera 30, etc., to a color conversion and binarization processing; a printing controller 160 for performing printing by transmitting print data, which has been binarized by the image processor 150, to a printhead; a mechanism controller 170 for controlling a paper feed mechanism and a carriage feed mechanism in order to carry out printing; and a printer engine 180 having a head for performing printing, a sensor for detecting the state of printing, a mechanism for transporting the print medium and a mechanism for transporting the carriage.

Assumed here is an example in which an image that has been captured by the digital camera 30 is transmitted directly to the printer 10 and printed thereby. First, the type of print medium on which image data is printed is detected. Information concerning the print medium is read by a print medium sensor (not shown) for detecting the type of print medium (not shown) that has been set in the printer engine 180, and the type of print medium is discriminated by the CPU 100. Various types of sensor can be used to detect the type of print medium, such as a sensor that projects light of a specific wavelength and reads the light that is reflected back. Since a technique for reading the print medium is itself not proposed here, this need not be described in detail. The image data captured by the digital camera 30 has been stored as a JPEG image in a memory (not shown) within the digital camera 30.

The digital camera 30 is connected to the USB host interface 140 of printer 10 by a connecting cable. The captured image stored in the memory of digital camera 30 is stored temporarily in the RAM 120 within printer 10 via the USB host interface 140. Since the image data that has been accepted from the digital camera 30 represents a JPEG image, a compressed image is decompressed using the CPU 100 to thereby obtain the image data that is stored in the RAM 120. On the basis of the image data, print data for being printed by the printhead in printer 10 is generated. The image data that has been stored in the RAM 120 is subjected to a color conversion and binarization processing by the image processor 150, the data is converted to print data (dot data) for printing and pass division for supporting multi-pass printing is carried out.

The data that has been converted to print data and divided into passes is delivered to the printing controller 160 and is transmitted to the printhead of the printer engine 180 in conformity with the order in which the printhead is driven. Ink discharge pulses are generated by the printing controller 160 in synch with the mechanism controller 170, which controls the motor and mechanical portions of the printer engine 180, and the printer engine 180 controlled by the mechanism controller 170, ink droplets are discharged and an image is formed on the print medium.

Although the image processor 150 in this embodiment executes binarization processing in order to print input image data, it will suffice if the image processor 150 can perform quantization in order to print the input image data. Accordingly, the image processor 150 is not limited to binarization processing. For example, printing can be performed upon dividing ink density into a number of stages, or control can be exercised by apportioning the sizes of ink droplets to a number of stages (e.g., two or three stages). That is, the present invention also covers an N-level conversion (where N is an integer equal to or greater than 2) for reducing the amount of data.

Further, although an example is illustrated in which the output of a print medium sensor (not shown) disposed in the printer engine 180 is read and the CPU 100 discriminates the type of print medium that has been set in the printer, there is also a technique for selecting the type of print medium during operation of the printer proper or operation of the digital camera. Since the present invention is for controlling the generation of print data in bidirectional printing, similar effects are obtained regardless of whether the detection method or selection method is adopted with regard to the type of print medium.

Further, although an example is illustrated in which image formation is carried out assuming that the source of image data to be printed is image data that has been captured by the digital camera 30, image formation may just as well be performed by transferring image data from the personal computer 20.

Figure 2:
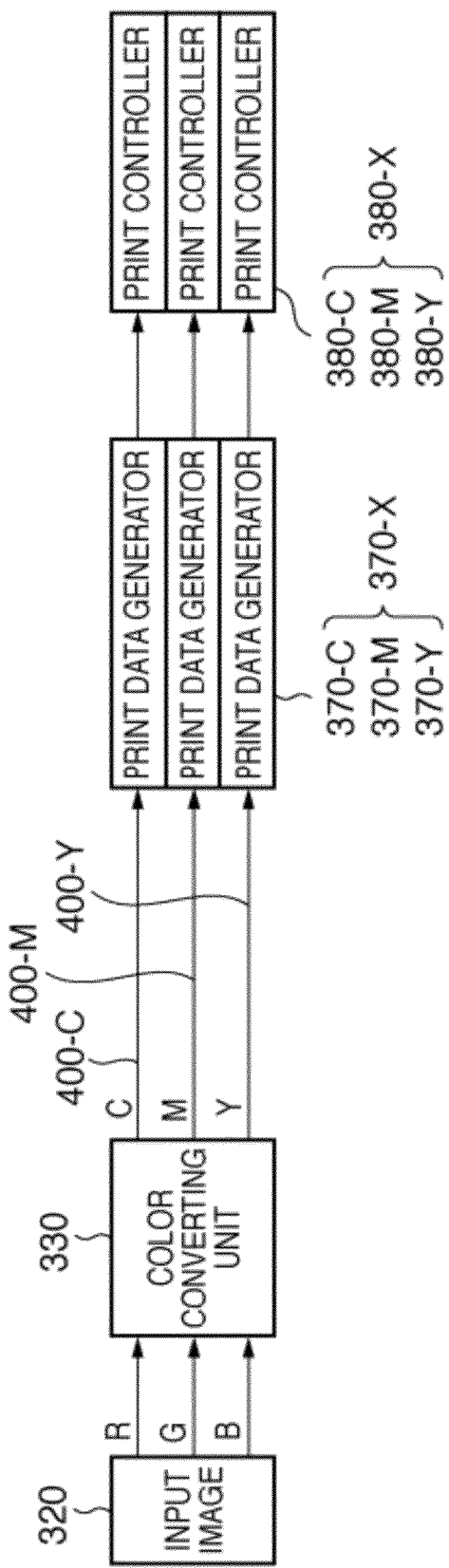
FIG. 2 is a block diagram illustrating the procedure of an operation up to printing of input image data 320.

FIG. 2 is a block diagram illustrating the procedure of operation up to printing of input image data 320. As shown in FIG. 2, a color converting unit 330 converts the input image data 320, which has RGB components, to CMY components of ink color. A print data generator 370-$x$ generates print data of each of the colors from the data that has been converted to ink color by the color converting unit 330. A print controller 380-$x$ forms an image, which is represented by the generated print data, on the print medium using an ink-jet printhead (not shown).

Figure 3:
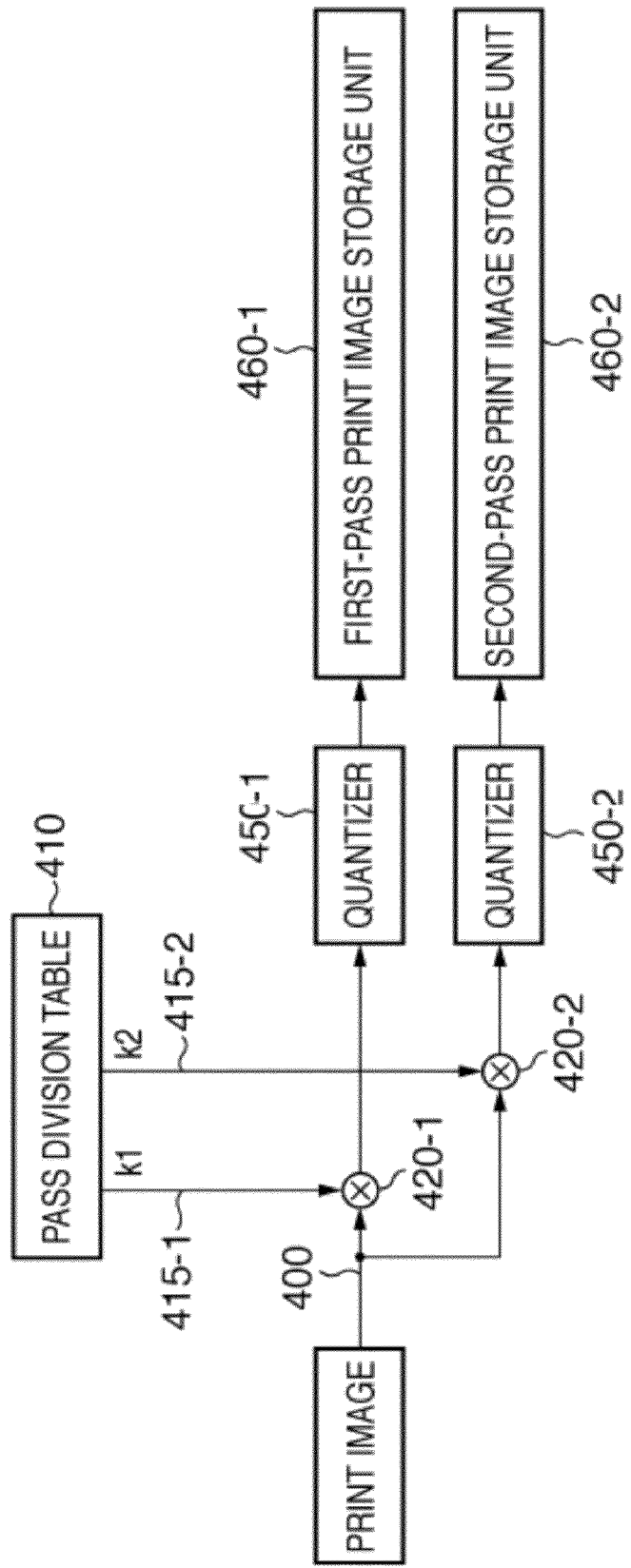
FIG. 3 is a block diagram illustrating the functional configuration of a print data generator 370-x.

FIG. 3 is a block diagram illustrating the functional configuration of the print data generator 370-$x$. Since the print image that has been converted to the component of each ink color has the same composition for each color, only one color component will be described here. The description will be for an example of two-pass printing. It should be noted that the present invention is not limited to two-pass printing and it goes without saying that the invention would be applied similarly also with regard to printing of other than two passes (e.g., three-pass printing).

As shown in FIG. 3, a print signal 400 is the result of a conversion, performed by the color converting unit 330 (see FIG. 2), to each ink color for the purpose of printing. A pass division table 410 stores pass-division coefficients for dividing image data into multiple passes. Indicated at 415-1 is a division coefficient k1 of a first pass and at 415-2 a division coefficient k2 of a second pass. Further, a multiplier 420-1 multiplies the print image 400 by the division coefficient k1 (415-1) of the first pass to thereby calculate the printing density of the first pass. A multiplier 420-2 multiplies the print image 400 by the division coefficient k2 (415-2) of the second pass to thereby calculate the printing density of the second pass. A quantizer 450-1 generates print data of the first pass from the output of the multiplier 420-1 that calculated the printing density of the first pass. A quantizer 450-2 generates print data of the second pass from the output of the multiplier 420-2 that calculated the printing density of the second pass. A first-pass print image storage unit 460-1 temporarily stores, as a print image of the first pass, the output of the quantizer 450-1 that generated the print data of the first pass. A second-pass print image storage unit 460-2 temporarily stores, as a print image of the second pass, the output of the quantizer 450-1 that generated the print data of the second pass.

The pass division table 410 decides the printing density of each pass when two-pass printing is performed. The division coefficients k1 and k2 indicate the division ratio. Division coefficients ki (k1, k2) can each be expressed as follows:

$$0 \leq ki \leq 1$$

$$k1+k2=1$$

In the case of two-pass printing, the division coefficients ki (k1, k2) may be set in such a manner that the print ratios of the first and second passes will be equal (i.e., k1=k2=0.5). Further, the division coefficients k1 and k2 may be set in such a manner that the print ratio of the second pass will be larger than the print ratio of the first pass (e.g., k1=0.4, k2=0.6). Thus, pass division can be performed at any density ratio by setting the division coefficients k1, k2.

The print signals that have been converted to the respective ink colors are input to the multipliers 420-$x$ that calculate the print densities of the respective passes and are multiplied by the division coefficients k1, k2 read out of the pass division table 410, whereby the print densities of the respective passes are decided.

A procedure for generating the print data of each pass will be described next. Generation of print data regarding the area of the first pass will be described first.

The print image 400 of each ink color separated by the color converting unit 330 into an ink color to be printed is multiplied in the multiplier 420-1 by the division coefficient k1 provided by the pass division table 410 in which the printing density ratio of each pass has been set. The printing density of the first pass is decided as a result. The printing density of the first pass is quantized by the quantizer 450-1 of the first pass, whereby print data is generated. The generated print data of the first pass is stored in the first-pass print image storage unit 460-1 as the print image of the first pass.

Next, generation of print data regarding the area of the second pass will be described.

The print image 400 of each ink color is multiplied in the multiplier 420-2 by the division coefficient k2 provided by the pass division table 410 in which the printing density ratio of each pass for multi-pass printing has been set. The printing density of the second pass is decided as a result. The printing density of the second pass is quantized by the quantizer 450-2 of the second pass.

Generation of print data will be described with reference to FIG. 10. The present invention is provided with the quantizer 450-1 for generating the print data of the first pass and the quantizer 450-2 for generating the print data of the second pass.

When printing is performed in an area (200-21 in FIG. 10) on the print medium, print data for the nozzle portion 220-21 that performs printing of the first pass of ink-jet head 220 is generated from the input image data. Further, print data for the nozzle portion 220-22 that performs printing of the second pass of ink-jet head 220 is generated. (In the latter case, there is no data since this nozzle portion is outside the print medium.)

Next, the print medium 200 is transported and the position of the ink-jet head 220 relative to the print medium is situated at 220-2. Here print data for the nozzle portion 220-21 that prints the first pass is generated and so is print data for the nozzle portion 220-22 that prints the second pass. That is, with respect to the area 200-21 of print medium 200, the print data of the first pass is generated before the scan of the first pass is performed, the scan of the first pass is completed and then the print data of the second pass is generated before the scan of the second pass is performed. Thus, when print data for when printing is performed multiple times by multi-pass printing in the same area of a print medium is generated, the generation of data is carried out independently in each pass of the multiple passes. This makes it possible to generate data print data using different parameters.

Figure 4:
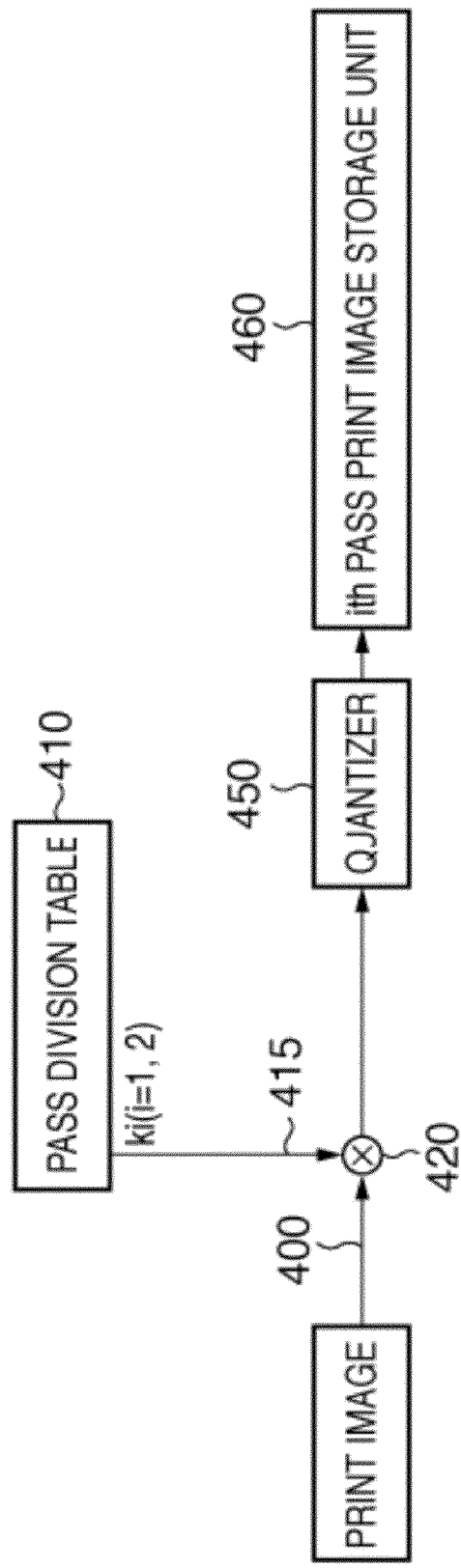
FIG. 4 is a block diagram illustrating another configuration for executing processing sequentially by the print data generator 370-x.

FIG. 4 is a block diagram illustrating another configuration for executing processing sequentially by the print data generator 370-$x$. This arrangement includes a multiplier 420 for performing pass division; a quantizer 450 for quantizing the print image of each pass obtained by pass division; and an ith-pass print image storage unit 460 for storing the print data of each pass. Division coefficients ki (k1, k2) of the respective passes conforming to the area are read out of the pass division table 410 and the multiplier 420 calculates the printing density conforming to the pass area. Print data conforming to each pass is generated by the quantizer 450. The generated print data is stored in the ith-pass print image storage unit 460 temporarily and printing is performed on the print medium by the printing controller (not shown in FIG. 4), whereby an image is formed.

Thus, in FIG. 3, in order to simplify the description, an example has been described in which two multipliers 420-1, 420-2 for pass division, two quantizers 450-1, 450-2 and two print image storage units 460-1, 460-2 are illustrated and two-pass printing is carried out. In actuality, however, processing is executed sequentially and circuits the number of which is equivalent to the number of passes are not necessarily required. It goes without saying, though, that a plurality of circuits can be provided and operated in parallel in order to achieve processing at high speed.

Figure 5:
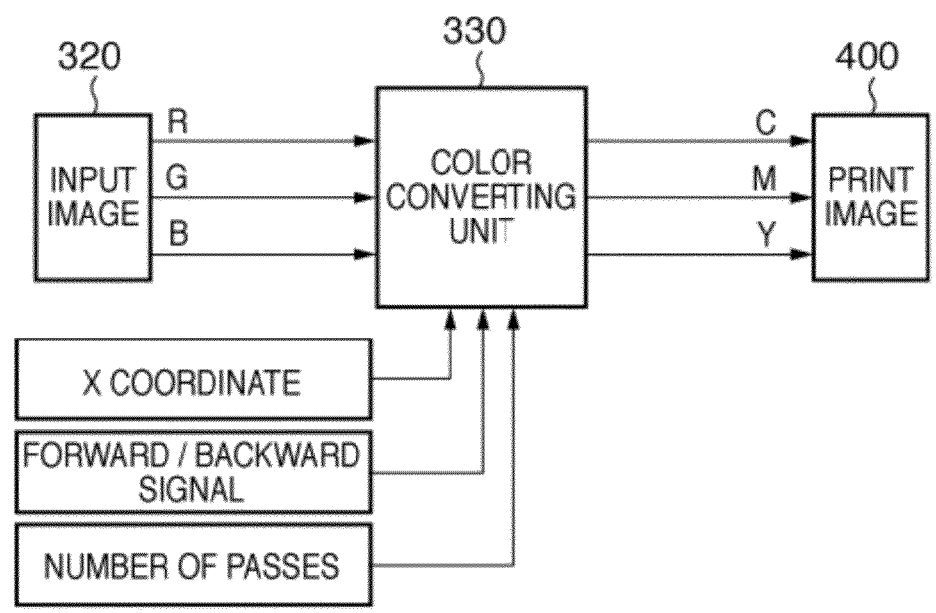
FIG. 5 is a block diagram illustrating the functional configuration of a color converting unit 330.

FIG. 5 is a block diagram illustrating the functional configuration of color converting unit 330. In a manner similar to that of FIG. 2, the input image data 320 having the RGB components is converted by the color converting unit 330 to CMY, which are the ink colors. At this time the color conversion is performed by inputting the input image data 320 (the entered image information) or a parameter such as the position (X coordinate) on the scanning line of each dot to be printed in the print image 400 generated by the color converting unit 330, the scanning direction (forward or backward) of the forward and backward scanning movement, and the number of passes, and taking this input into consideration.

Figure 6A:
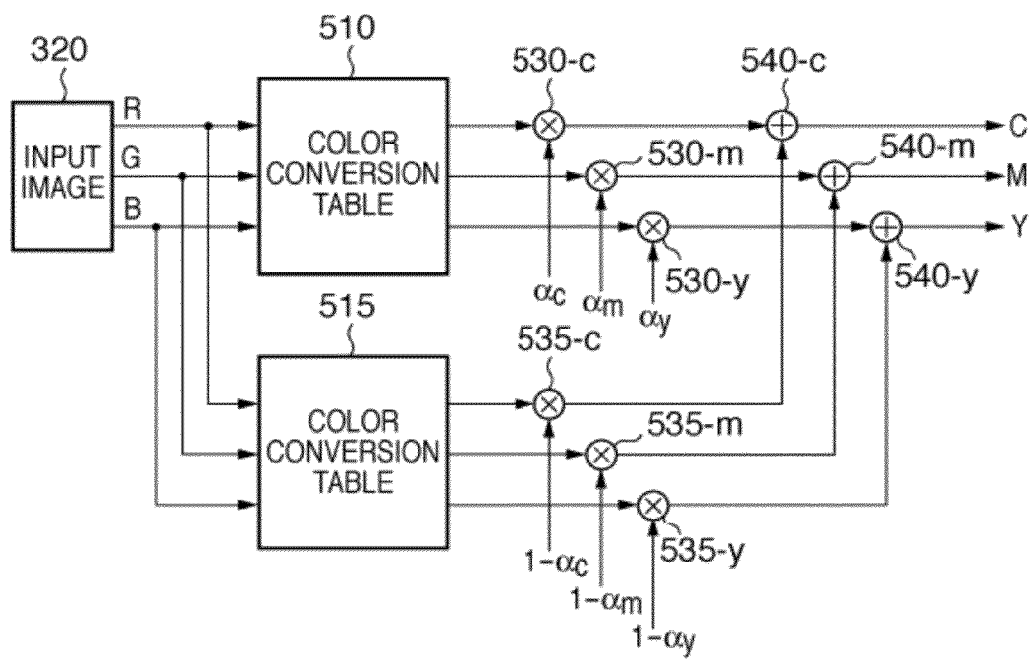
FIGS. 6A and 6B are block diagrams illustrating the functional configuration of the color converting unit 330 in greater detail.
Figure 6B:
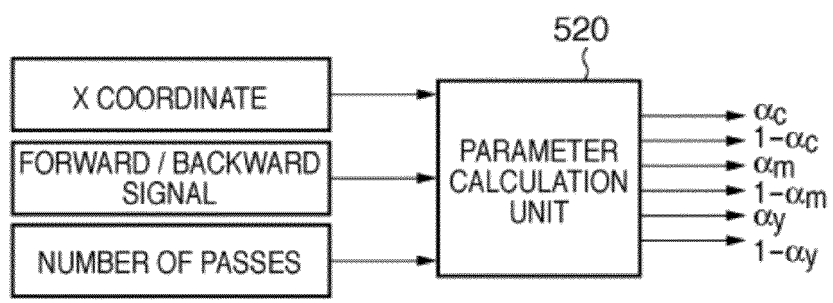

FIGS. 6A and 6B are block diagrams illustrating the functional configuration of the color converting unit 330 in greater detail. The arrangement includes a color conversion table 510 for converting from RGB to CMY; a color conversion table 515 for converting from RGB to CMY; and a parameter calculation unit 520, to which an X coordinate, forward/backward signal and number of passes are input, for calculating color-conversion parameters $\alpha c$, $\alpha m$, $\alpha y$, $1-\alpha c$, $1-\alpha m$ and $1-\alpha y$.

A multiplier 530-$c$ multiplies the cyan output of the color conversion table 510 by the parameter $\alpha c$ calculated by the parameter calculation unit 520. A multiplier 530-$m$ multiplies the magenta output of the color conversion table 510 by the parameter $\alpha m$ calculated by the parameter calculation unit 520. A multiplier 530-$y$ multiplies the yellow output of the color conversion table 510 by the parameter $\alpha y$ calculated by the parameter calculation unit 520. A multiplier 535-$c$ multiplies the cyan output of the color conversion table 515 by the parameter $1-\alpha c$ calculated by the parameter calculation unit 520. A multiplier 535-$m$ multiplies the magenta output of the color conversion table 515 by the parameter $1-\alpha m$ calculated by the parameter calculation unit 520. A multiplier 535-$y$ multiplies the yellow output of the color conversion table 515 by the parameter $1-\alpha y$ calculated by the parameter calculation unit 520.

An adder 540-$c$ adds the result of multiplication by the multiplier 530-$c$ and the result of multiplication by the multiplier 535-$c$. An adder 540-$m$ adds the result of multiplication by the multiplier 530-$m$ and the result of multiplication by the multiplier 535-$m$. An adder 540-$y$ adds the result of multiplication by the multiplier 530-$y$ and the result of multiplication by the multiplier 535-$y$.

As mentioned above, in the case of multi-pass printing in which printing is performed in each of forward and backward scans, a difference develops in printing time in dependence upon the X coordinate. Consequently, this appears as a density difference and causes color unevenness (or band-like unevenness). When the input image data is converted to ink color in accordance with forward/backward printing, number of passes and X coordinate, therefore, it will suffice to make the conversion and generate the print data upon imparting a density difference.

To achieve this, the two color conversion processing operations are furnished with a density difference by providing the two color conversion tables 510 and 515. For example, the color conversion table 515 is adapted to perform a conversion for which the output density is less than that of the color conversion table 510.

In order to simplify the description, it will be assumed that only a density correction based upon overlapping of identical inks is performed and not a correction based upon the order of overlap of inks of different colors. By changing the ratio at which data that is output from the two density tables is added in dependence upon the X coordinate, print data having a density gradient conforming to the X coordinate is output. The density gradient is decided from the scanning speed of the ink-jet head; the time difference of bidirectional scanning dependent upon the width of the print medium; the speed of absorption, drying and fixation, which depends upon the print medium and the ink components; and the final degree of influence of these on the density of the image on the print medium. In actual printing, each of the above-mentioned conditions is fixed and does not vary during the printing of one sheet. This means that it is necessary to prepare a parameter calculation equation for every condition. Parameter calculation equations used in the parameter calculation unit 520 are as follows:

$$\alpha c = fcx(x,d,p)$$

$$\alpha m = fmx(x,d,p)$$

$$\alpha y = fyx(x,d,p)$$

where x, d and p represent the X coordinate, scanning direction (forward or backward) and number of passes (a numerical value indicating the ordinal number of the pass), respectively.

It is so arranged that when print data for the second pass is output, the print data is output upon appending a density gradient that is the opposite of the density gradient for the first pass. Thus, when two-pass printing, for example, is performed, printing to which a density gradient conforming to the X coordinate has been imparted so as to obtain a uniform density in both forward and backward printing is carried out.

Thus, as described above, print data is generated for every pass of multi-pass printing and since it is so arranged that the print data is generated in dependence upon the X coordinate in bidirectional printing, it is possible to reduce density unevenness horizontally of the print medium produced when bidirectional printing is performed and to form an image having a uniform tint. As a result, it is also possible to reduce band-like unevenness produced by reversal, every back-and-forth printing scan, of density unevenness horizontally of the print medium produced when bidirectional printing is performed. Further, since print data is generated in dependence upon the X coordinate, it is possible to correct for unevenness ascribable to mechanical variations caused by cogging of the carriage motor or by gear eccentricity, etc.

In this embodiment, the parameter calculation equation is changed in accordance with the scanning direction (forward or backward). However, this does not impose a limitation upon the present invention. For example, it may be so arranged that the outputs of the color conversion tables 510 and 515 are changed in accordance with the scanning direction (forward or backward). In this case, the signal for identifying the scanning direction (forward/backward) that is input to the parameter calculation unit 520 would be unnecessary.

Modification of First Embodiment

In the first embodiment described above, a color conversion is performed using the input image data 320 (the entered image information) or the position (X coordinate) on the scanning line of each dot to be printed in the print image 400 generated by the color converting unit 330. However, the color conversion may just as well be performed using the time interval between scans as the parameter.

In case of multi-pass printing in which printing is performed in each of forward and backward scans, a difference develops in ink impact time between adjacent dots and, as a consequence, this appears as a density difference and gives rise to color unevenness (or band-like unevenness), as mentioned above. This means that when the input image data is converted to ink color, it will suffice to make the conversion and generate the print data upon imparting the density difference in accordance with a signal indicating whether the printing direction is forward or backward, a signal indicating what the ordinal path number of the scan of interest is, and a signal indicating the time difference between the scan of interest and the immediately preceding scan.

In this case, parameter calculation equations used in the parameter calculation unit 520 are as follows:

$$\alpha c = fct(t,d,p)$$

$$\alpha m = fmt(x,d,p)$$

$$\alpha y = fyt(t,d,p)$$

where t, d and p represent the time difference between the scan of interest and the immediately preceding scan, scanning direction (forward or backward) and number of passes (a numerical value indicating the ordinal number of the pass), respectively.

At the time of printing of the first pass, no previous pass has yet been printed and therefore t can be considered to be infinitely large and a constant value in the printing area of the print medium. The parameters $\alpha c$, $\alpha m$, $\alpha y$ are constant values (e.g., 0.5). In the first pass, therefore, printing is performed at a uniform density.

At the time of printing of the second pass, a time difference exists between this pass and the printing of the first pass and therefore the value of each parameter changes in accordance with the time difference. At the start of printing of the second pass, the time interval is short and the printing density is low as a result. In order to correct for this, parameters are set so as to increase the printing density. That is, if the color conversion table 510 is made a conversion table whose density is high, then the parameters $\alpha c$, $\alpha m$, $\alpha y$ that multiply the output of the color conversion table 510 are made high values. As a result, the parameters $1-\alpha c$, $1-\alpha m$, $1-\alpha y$ that multiply the output of the color conversion table 515 whose output density is low become low values and the print image density obtained by addition increases. On the side where printing of the second pass ends, the time interval is long and printing density is high as a result. In order to correct for this, the addition parameters of the two tables are set so as to decrease the printing density.

As opposed to the case described earlier, the parameters $\alpha c$, $\alpha m$, $\alpha y$ that multiply the output of the color conversion table 510 whose printing density is high are made low values. As a result, the parameters $1-\alpha c$, $1-\alpha m$, $1-\alpha y$ that multiply the output of the color conversion table 515 whose output density is low become high values and the print image density obtained by addition decreases. By thus increasing or decreasing print image density upon taking into consideration the printing time difference relative to the immediately preceding pass, it is possible to form an image of uniform output density even if though the time difference due to bidirectional printing changes.

Furthermore, by controlling printing density using the parameter that is the time interval between current printing and printing performed previously, there are cases where a time difference greater than the time interval that prevails when ordinary bidirectional printing is performed occurs when an operation such as recovery of the ink-jet head is carried out during the course of bidirectional printing. Further, there are also cases where the user opens the printer panel during printing and cases where, when printing is being performed from a host personal computer, the transfer of data from the host personal computer is suspended for some reason and a long printing time difference results. In such cases also, controlling the printing density in accordance with the prolonged time difference reduces the density difference and difference in color when printing is resumed and makes it possible to form a uniform image.

Thus, in accordance with this modification, as described above, by changing the printing density in accordance with the time difference, forward/backward printing and number of passes in multi-pass printing for performing bidirectional printing, a change in output density in dependence upon the time difference and a reversal in density in band-by-band can be suppressed. This makes it possible to form an image having a uniform density.

More specifically, in accordance with this modification, print data is generated every pass of multi-pass printing and print data is generated in dependence upon a printing time difference ascribable to bidirectional printing. When bidirectional printing is performed, therefore, density unevenness that occurs in the main-scan direction (left-right direction) of the print medium can be reduced and an image having a uniform color can be formed. As a result, it is also possible to reduce band-like unevenness produced by reversal, every back-and-forth printing scan, of density unevenness produced in the main-scan direction of the print medium every back-and-forth printing scan.

Further, not only at the time of ordinary printing but also when there is an unexpected suspension of printing due to user operation (e.g., pressing of a halt key or opening of a door) at the time of printing or because the apparatus is waiting for input of print data, print data can be generated again upon changing the parameters for generating the print data in accordance with this suspension time. A further example of such suspension is a temporary suspension for cleaning nozzles in a printer equipped with a nozzle recovery system for detecting clogging of the printhead nozzles and implementing cleaning of the nozzles automatically. As a result, density unevenness can be reduced and an image of uniform color can be formed.

In the foregoing embodiment and modification thereof, a density gradient is imparted to the X coordinate of the print image or to the time interval between scans by changing the addition ratio of the outputs of the two color conversion tables having the density difference. However, this does not impose a limitation upon the present invention. For example, the two color conversion tables 510, 515 may be replaced by a single color conversion table and arithmetic unit or a matrix operation may be performed without using the color conversion tables 510, 515. Further, rather than adopt an arrangement in which the ratio at which the outputs of the two color converters having different densities are added, the print image may be furnished with a density gradient by changing the color conversion parameters of one color converter directly in dependence upon the X coordinate or time interval between scans.

Further, in the foregoing embodiment and modification thereof, the X coordinate of the print image, the time interval between scans, the forward/backward signal and the number of passes are used as parameters by the color converting unit 330. However, the type of print medium can be detected by a sensor and the result of detection can be used as a parameter. This is because, depending upon the type of print medium (e.g., the qualities of the material), the absorptivity of ink differs and the time required for the ink to dry differs.

Second Embodiment

In the first embodiment described above, density unevenness of bidirectional printing is reduced by the color converting unit 330. This embodiment differs in that density unevenness of bidirectional printing is reduced by print data generator 370. Components similar to those of the first embodiment are designated by like reference characters and need not be described again.

Figure 7A:
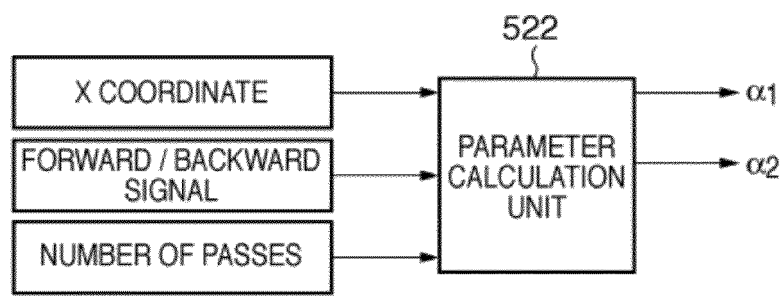
FIGS. 7A and 7B are block diagrams illustrating the functional configuration of a print data generator according to a second embodiment of the present invention.
Figure 7B:
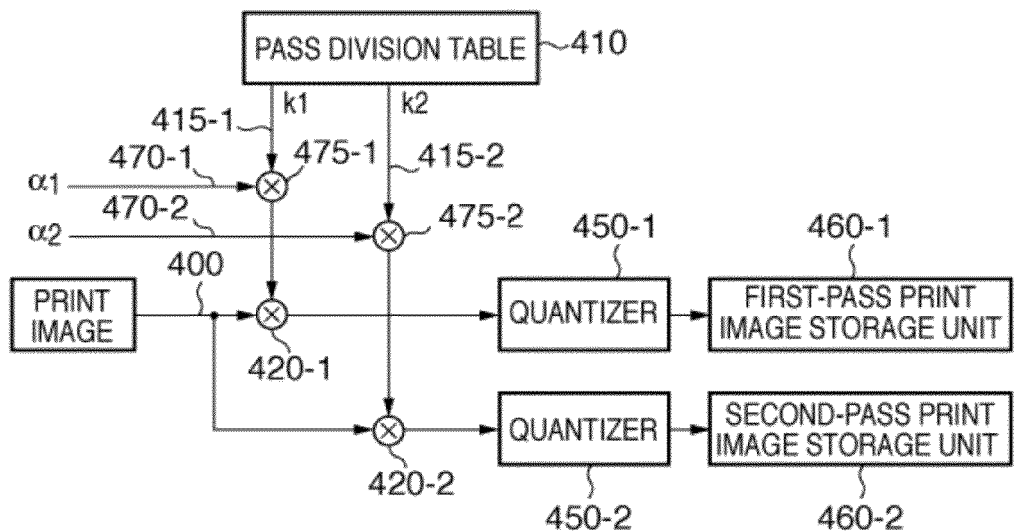
Figure 8A:
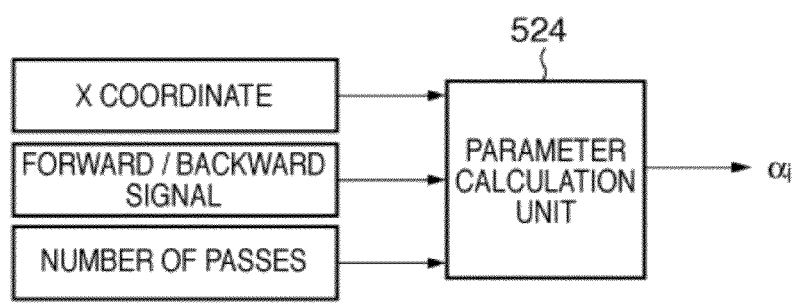
FIGS. 8A and 8B are block diagrams illustrating another configuration for executing processing sequentially by the print data generator 370-x.
Figure 8B:
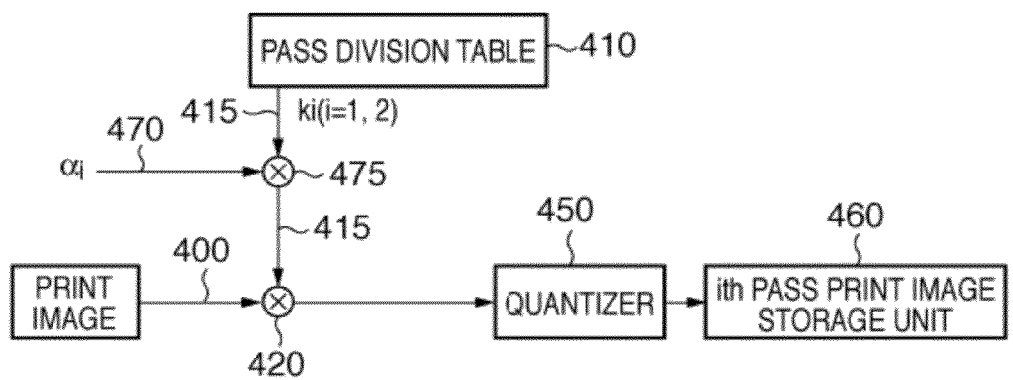
Figure 11:
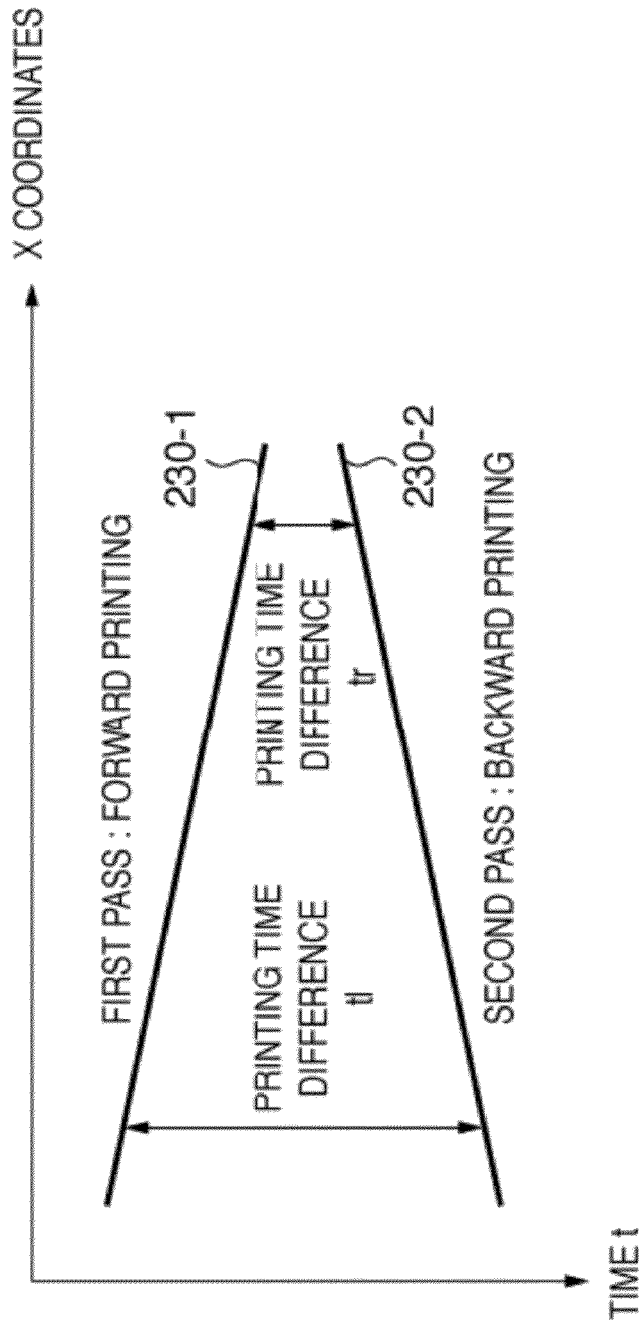
FIG. 11 is a diagram illustrating the relationship between X coordinates and printing time in two-pass printing.

FIGS. 7A and 7B are block diagrams illustrating the functional configuration of a print data generator according to the second embodiment, and FIGS. 8A and 8B are block diagrams illustrating another configuration for executing processing sequentially by the print data generator 370-x. In this embodiment, the print data generator is obtained by additionally providing the arrangement of the first embodiment (FIG. 3) with components that take into consideration parameters that depend upon the X coordinate.

A parameter calculation unit 522 receives the X coordinate, forward/backward signal and number of passes as input signals and calculates parameters $\alpha 1$, $\alpha 2$ with respect to pass division coefficients. A multiplier 470-1 multiplies a pass division coefficient 415-1 of a first pass, which is the output of the pass division table 410, by the parameter $\alpha 1$ calculated by the parameter calculation unit 522. A multiplier 470-2 multiplies a pass division coefficient 415-2 of a second pass, which is the output of the pass division table 410, by the parameter $\alpha 2$ calculated by the parameter calculation unit 522. The arrangement of this embodiment is the same as that of the first embodiment (FIG. 3) in other respects.

In this embodiment, the printing ratio in each pass is changed by the parameter calculation unit 522 based upon the X coordinate, forward/backward signal and number of passes. For example, in case of two-pass printing, printing basically is performed at a printing ratio of 50% in both the first and second passes.

The parameter calculation unit 522 is adapted to vary the parameter $\alpha 1$ from 1.2 to 0.8 in dependence upon the X coordinate. As a result, the printing ratio is set lower (e.g., 40%) in order to correct for darker printing at the beginning of printing of the first pass and is set higher (e.g., 60%) in order to correct for lighter printing near the end of printing of the first pass. A gradient can thus be imparted to the printing ratio in dependence upon the X coordinate. That is, since there is time for drying and fixation near the beginning of printing where the time until the printing of the next pass is long, a somewhat large amount of the ink droplet is discharged.

On the other hand, since there is no time for drying and fixation near the end of printing where the time until the printing of the next pass is short, a somewhat small amount of the ink droplet is discharged. Further, the parameter calculation unit 522 is adapted to vary the parameter $\alpha 2$ from 1.2 to 0.8 in dependence upon the X coordinate. As a result, the printing ratio is set higher (e.g., 60%) at the beginning of printing of the second pass and is set lower (e.g., 40%) near the end of printing of the second pass. As a result, a gradient is imparted to the printing ratio of each pass in dependence upon the X coordinate. Accordingly, when bidirectional printing is carried out, the printing ratio is raised where the time interval up to printing of the next pass is long and enough time for drying and fixation of the discharged ink droplet can be assured. On the other hand, the printing ratio is kept low where the time interval up to printing of the next pass is short and enough time for drying and fixation of the discharged ink droplet cannot be assured.

Thus, when printing of the next pass has been performed by reversing the ink-jet head, if the ink droplet discharged in the immediately preceding pass cannot dry because the printing time interval is too short, the ink droplet merges with the adjacent ink droplet. As a result, a decline in density can be suppressed.

In the first embodiment, the blocks for the first and second passes in FIG. 7B are provided independently in order to simplify the description. However, since the input image is two-dimensional data, it will suffice if one of each block is provided if the fact that the data is raster-scanned and input sequentially. Further, this embodiment may be arranged as shown in FIGS. 8A and 8B in a manner similar to that of FIG. 4 illustrated in the first embodiment.

In accordance with this embodiment, effects similar to those of the first embodiment can be obtained, as set forth above.

In this embodiment, a case where the printing ratios of the first and second passes are equal (e.g. 50%) is assumed. However, this does not impose a limitation upon the present invention. For example, similar effects can be obtained by calculating the parameters $\alpha 1$, $\alpha 2$ appropriately also in a case where the printing ratio of the first pass is lowered and that of the second pass is raised.

In this embodiment, a correction is applied from the first pass. However, this does not impose a limitation and it may be so arranged that ordinary printing is performed in the first pass and a correction applied from the second pass onward. In other words, an arrangement may be adopted in which a correction is applied at least one time among all passes.

An example of two-pass printing is described in this embodiment. However, the present invention is not limited to such an arrangement and can be applied to three-pass printing, four-pass printing or multi-pass printing of a higher number of passes.

Figure 13:
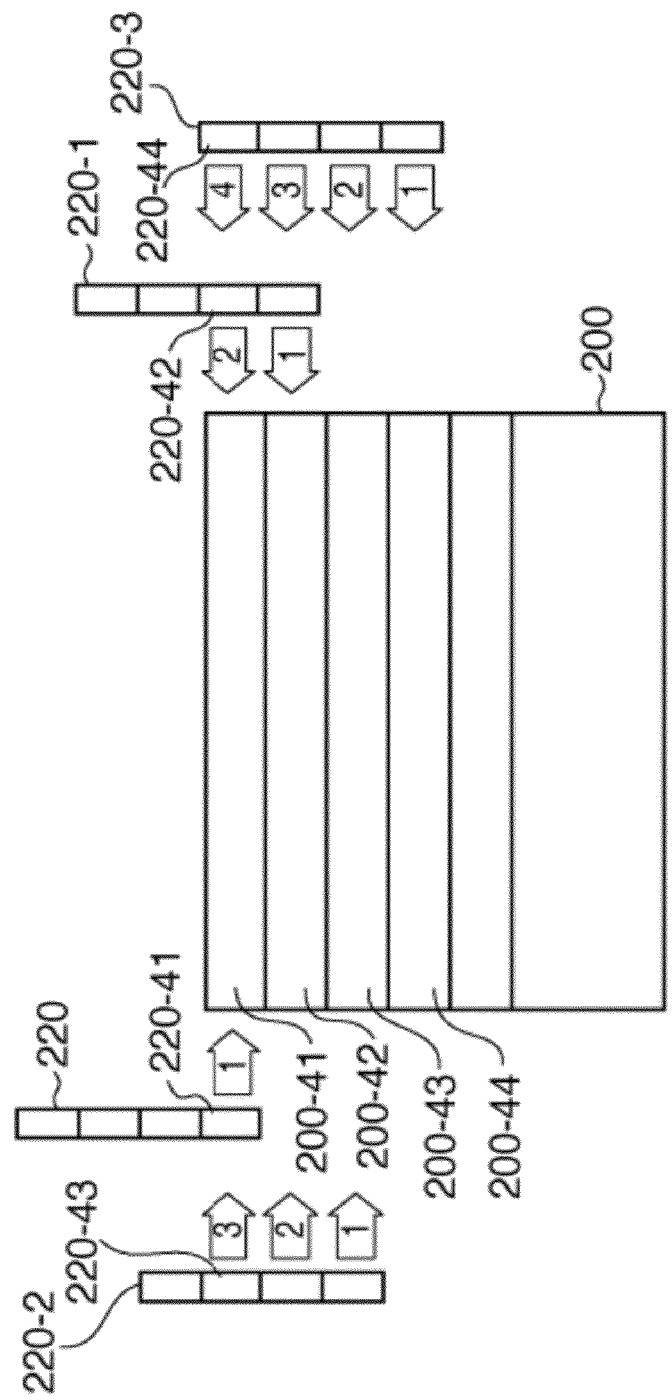
FIG. 13 is a diagram illustrating an example of four-pass printing.
Figure 14:
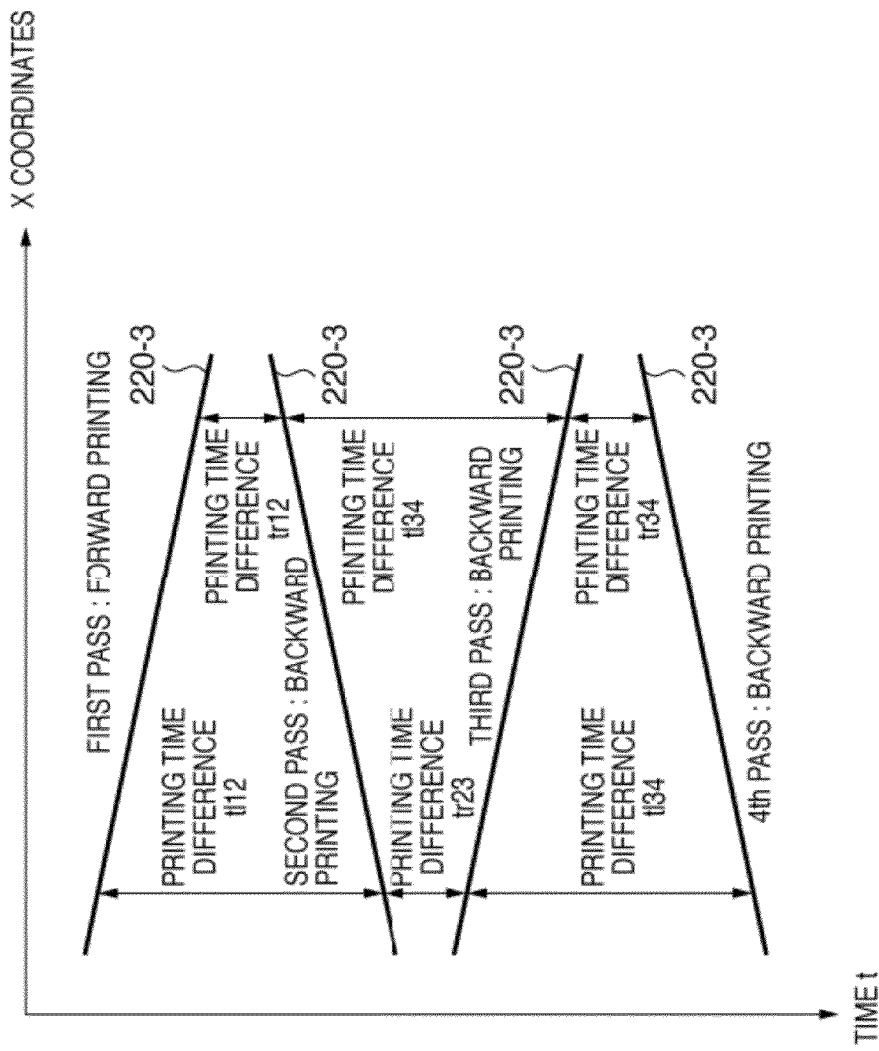
FIG. 14 is a diagram illustrating printing time intervals.

FIG. 13 is a diagram illustrating an example of four-pass printing, and FIG. 14 is a diagram illustrating the printing time intervals. Since four-pass printing forms an image by printing four times, the printing time intervals continue three times in the manner "long-short-long" or "short-long-short" unlike two-pass printing. However, it will suffice to set a parameter corresponding to the X coordinate on the assumption that printing of the second pass continues three times, as in this embodiment.

Furthermore, by adding on a density correction term for mechanical noise (a shift in ink impact position), which is ascribable to cogging of the carriage motor or gear eccentricity, to the parameter calculation units 522, 524, it is also possible to simultaneously reduce density unevenness ascribable to mechanical noise with an identical arrangement. Further, if the distance between the ink-jet head and the print medium (referred to as the "head-to-paper distance" below) differs, a shift in the ink impact position occurs and this can cause printing density unevenness. There are instances where this is produced intentionally by the mechanical mechanism that restrains the print medium. The head-to-paper distance produced by the mechanical mechanism is thus decided by the position of the X coordinate. This means that it is also possible to perform printing control based upon the X coordinate so as to correct for printing density error ascribable to a fluctuation in the head-to-paper distance. As a result, it is possible to reduce density unevenness even with respect to a fluctuation in head-to-paper distance.

In this embodiment, a color conversion is performed using the input image data 320 (the entered image information) or the position (X coordinate) on the scanning line of each dot to be printed in the print image 400 generated by the color converting unit 330. However, the color conversion may just as well be performed using the time interval between scans as the parameter in a manner similar to that of the modification of the first embodiment.

Other Embodiments

The present invention may be applied to a system constituted by a plurality of devices (e.g., a host computer, interface, reader, printer, etc.) or to an apparatus comprising a single device (e.g., a copier or facsimile machine, etc.).

Further, a computer-readable storage medium (or recording medium) storing the code of a computer program of software for performing the functions of the foregoing embodiments may be supplied to a system or an apparatus, and a computer (or CPU or MPU) of the system or apparatus may read and execute the program code stored on the storage medium. In this case, the program codes per se read from the storage medium implement the functions of the embodiments, and the storage medium storing the program code constitutes the invention. Further, it goes without saying that the present invention also covers a case where an operating system or the like running on the computer performs a part of or the entire actual processing based upon the designation of program codes and implements the functions of the embodiments by this processing.

Furthermore, program code read from a storage medium is written to a memory provided on a function expansion card inserted into the computer or provided in a function expansion unit connected to the computer. Thereafter, a CPU or the like provided on the function expansion card or function expansion unit performs a part of or the entire actual processing based upon the designations in the program code, and the functions of the above embodiments are implemented by this processing. Such a case also is covered by the present invention.

Further, in a case where the embodiments are applied to the above-mentioned computer-readable storage medium, the code of the computer program corresponding to the flowcharts and functional configuration described above is stored on this storage medium.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2008-180680 filed on Jul. 10, 2008 and 2008-180681 filed on Jul. 10, 2008, which are hereby incorporated by reference herein in their entirety.

What is claimed is:

1. An image forming apparatus for forming an image by causing a printhead having a plurality of ink discharge portions to scan the same area on a print medium a plurality of times, and discharging ink onto the print medium, based upon entered image information, in each of forward and backward scanning movements to thereby form dots as individual pixels, said apparatus comprising:
a color converting unit configured to subject the entered image information to a color conversion in accordance with ink color and generate a print image;
a print data generating unit configured to generate print data of each scan corresponding to multiple scans of the print image generated by said color converting unit;
a control unit configured to control at least one of said color converting unit and said print data generating unit based upon a printing time interval between scans; and
a printing unit configured to print on the print medium based upon the print data generated by said print data generating unit,
wherein said control unit controls at least one of said color converting unit and said print data generating unit based upon scanning direction of the forward and backward scanning movement.

2. An image forming method for forming an image by causing a printhead having a plurality of ink discharge portions to scan the same area on a print medium a plurality of times, and discharging ink onto the print medium, based upon entered image information, in each of forward and backward scanning movements to thereby form dots as individual pixels, said method comprising:
a color converting step of subjecting the entered image information to a color conversion in accordance with ink color and generating a print image;
a print data generating step of generating print data of each scan corresponding to multiple scans of the print image generated at said color converting step; and
a printing step of printing on the print medium based upon the print data generated at said print data generating step;
wherein at least one of said color converting step and said print data generating step is controlled based upon a printing time interval between scans, and
wherein said at least one of said color converting step and said print data generating step is controlled based upon scanning direction of the forward and backward scanning movement.

3. A non-transitory computer-readable storage medium on which has been stored a computer program which, by being read by a computer, causes the computer to execute the steps set forth in claim 2.

4. An image processing apparatus which controls an image forming apparatus for forming an image by causing a printhead having a plurality of ink discharge portions to scan the same area on a print medium a plurality of times, and discharging ink onto the print medium, based upon entered image information, in each of forward and backward scanning movements to thereby form dots as individual pixels, said image processing apparatus comprising:
a color converting unit configured to subject the entered image information to a color conversion in accordance with ink color and generate a print image;
a print data generating unit configured to generate print data of each scan corresponding to multiple scans of the print image generated by said color converting unit;
a control unit configured to control at least one of said color converting unit and said print data generating unit based upon a printing time interval between scans so that the image forming apparatus prints on the print medium based upon the print data generated by said print data generating unit,
wherein said control unit controls at least one of said color converting unit and said print data generating unit based upon scanning direction of the forward and backward scanning movement.

* * * * *